(12) United States Patent
Egawa

(10) Patent No.: US 6,561,661 B2
(45) Date of Patent: May 13, 2003

(54) SPREAD ILLUMINATING APPARATUS WITH A PAIR OF LIGHT SOURCES OVERLAPPED IN A THICKNESS DIRECTION OF A TRANSPARENT SUBSTRATE

(75) Inventor: Motoji Egawa, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 1 day.

(21) Appl. No.: 09/985,136

(22) Filed: Nov. 1, 2001

(65) Prior Publication Data

US 2002/0051354 A1 May 2, 2002

(30) Foreign Application Priority Data

Nov. 2, 2000 (JP) .......................... 2000-335846

(51) Int. Cl.$^7$ ............................................... G01D 11/28
(52) U.S. Cl. ........................... 362/27; 362/31; 362/555; 385/901
(58) Field of Search ................ 362/27, 26, 31, 362/555, 561; 385/901, 34, 35, 131

(56) References Cited

U.S. PATENT DOCUMENTS 6,283,602 B1 * 9/2001 Kawaguchi et al. .......... 362/31
6,431,716 B1 * 8/2002 Kusakabe ..................... 362/31

* cited by examiner

Primary Examiner—Sandra O'Shea
Assistant Examiner—Ali Alavi
(74) Attorney, Agent, or Firm—Oliff & Berridge, PLC

(57) ABSTRACT

There is provided a spread illuminating apparatus realizing both uniform light emission and high brightness. Two bar-like light conductive members made of a transparent material and each having a spot-like light source disposed on a large end thereof are disposed so as to overlap with each other in the thickness direction of a transparent substrate, thereby constituting a pair of bar-like light sources. Light emitted from the spot-like light source and entering one light conductive member of the two is directly guided into the transparent substrate without passing through the other light conductive member. Thus, light rays emitted from the two light conductive members do not interfere with each other so as to prevent generation of interference fringes, resulting in that uniform light emission and high brightness in the spread illuminating apparatus can be realized.

10 Claims, 6 Drawing Sheets

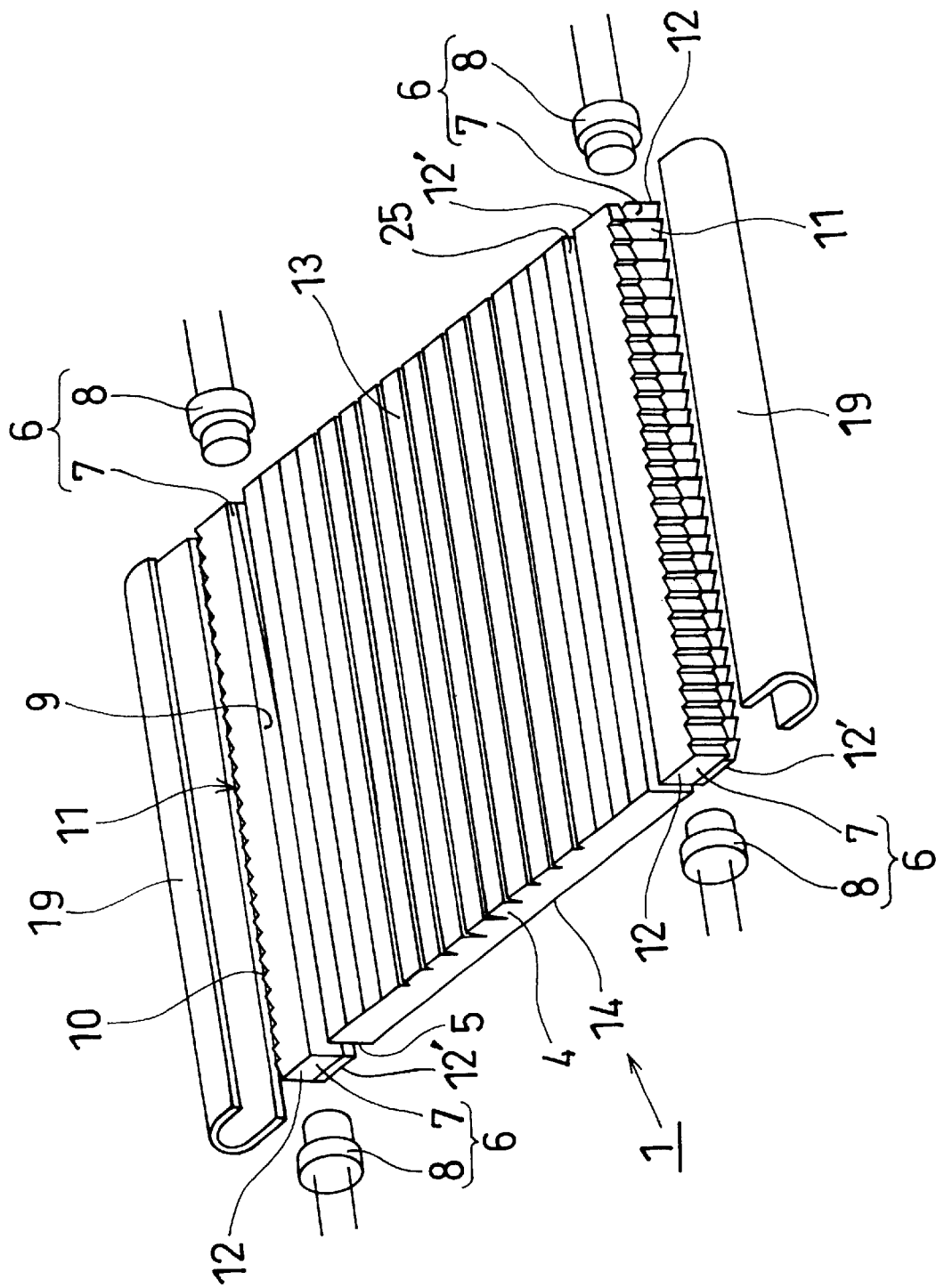

SPREAD ILLUMINATING APPARATUS WITH A PAIR OF LIGHT SOURCES OVERLAPPED IN A THICKNESS DIRECTION OF A TRANSPARENT SUBSTRATE

BACKGROUND OF THE INVENTION

1. Field of the Invention

The present invention relates to a spread illuminating apparatus particularly used as an illuminating means for a liquid crystal display.

2. Description of the Related Art

A demand for a liquid crystal display has been increased mainly for personal computers and mobile phones since the liquid crystal display which operates at low power consumption features low profile and light weight. Since a liquid crystal which is a component member of the liquid crystal display does not emit light by itself unlike a light emitting element such as a cathode ray tube, an illuminating means for illuminating the liquid crystal for use in a dark place is required. In particular, in the recent demand for lower profile and smaller power consumption, there has been a growing tendency to employ a spread illuminating apparatus of side light type (light conductive member type) as an illuminating means for illuminating the liquid crystal display.

FIG. 5 illustrates a spread illuminating apparatus of side light type, particularly intended for increasing brightness. A spread illuminating apparatus 1' is generally composed of a transparent substrate 4 disposed so as to cover a surface 3 (an observation surface) of a liquid crystal device 2 with a lower surface 14 facing the surface 3, and a light source 6 disposed along an end surface 5 of the transparent substrate 4. The transparent substrate 4 is made of a highly light-transmissible material, shaped like a flat plate and substantially rectangular in section. A light reflection pattern 15 is formed on a surface 13 (an upper surface) of the transparent substrate 4. The light reflection pattern 15 is formed parallel to the end surface 5 and composed of a plurality of grooves 16 substantially triangular in section and a plurality of flat portions 17 adjacent to the grooves 16. In order to uniform light emitted from the light source 6, the ratio of the width of the grooves 16 to the width of the flat portions 17 is set to increase in proportion to the increase in distance from the end surface 5 of the transparent substrate 4.

The light source 6 is generally composed of a bar-like light conductive member 7 made of a transparent material and disposed along and close to the end surface 5 of the transparent substrate 4, and a spot-like light source 8 disposed facing one end of the light conductive member 7. Moreover, an optical path conversion means 11 is provided on the light conductive member 7. The optical path conversion means 11 is formed on a surface 10 opposing a surface 9 facing the end surface 5 of the transparent substrate 4 such that grooves, for example, triangular in section run in the thickness direction of the transparent substrate 4, or that surface roughening is partially provided whereby light emitted from the spot-like light source 8 is made incident on the end surface 5 of the transparent substrate 4 in a substantially uniform manner. Further, in order to achieve a uniform emission of light from the bar-like light conductive member 7, the depth of the grooves triangular in section preferably increases in proportion to the increase in distance from the spot-like light source 8.

Also, in FIG. 5, two light sources 6 are disposed along and parallel to the end surface 5 of the transparent substrate 4 (hereinafter one located far from the transparent substrate 4 is referred to as "outer light source" and the other located close to the transparent substrate 4 as "inner light source"). Light emitted from the outer light source 6 passes through the light conductive member 7 of the inner light source and enters the end surface 5 of the transparent substrate 4. Thereby, the amount of light incident on the transparent substrate 4 is increased, and the brightness of the screen can be improved compared with a case where only one light source 6 is provided.

Further, as in a spread illuminating apparatus 1" shown in FIG. 6, two light sources 6 may be disposed along both the end surface 5 of the transparent substrate 4 and an end surface 25 opposite to the end surface 5, respectively. In this case, the ratio of the width of the grooves 16 to the width of the flat portions 17 is set to be maximum at a center portion of the transparent substrate 4. In addition, in order to introduce a still larger amount of light from the light source 6 into the transparent substrate 4, a light reflection member 19 may be provided so as to cover the respective light conductive members 7.

The light conductive member 7 is formed into a wedge-shape in such a manner that the area of an end surface 12' opposite to an end surface 12 facing the spot-like light source 8 is smaller than that of the end surface 12, whereby light leakage at the end surface 12' is reduced. Accordingly, light enters efficiently the transparent substrate 4, thereby improving the brightness of the screen. Here, in the wedge-shaped light conductive member, an end including the end surface 12 having a larger area is referred to as a "large end", and another end including the end surface 12' having a smaller area is referred to as a "small end".

The spread illuminating apparatuses 1' and 1" shown in FIGS. 5 and 6, respectively, include the following problems. Specifically, the two light sources 6 are disposed at the respective end surfaces 5 and 25 of the transparent substrate 4 for the purpose of improving the brightness of the screen. And, light emitted from the outer light source 6 of the two light sources 6 disposed parallel to each other passes through the light conductive member 7 of the inner light source 6 and enters the end surface 5 of the transparent substrate 4.

However, light which is emitted from the outer light source 6 passes through the light conductive member 7 of the inner light source 6 and enters the end surfaces 5, 25 and light which is emitted from the inner light source 6, travels in the light conductive member 7 of the inner light source 6 and enters the end surface 5, 25 interfere with each other. This generates interference fringes resulting in that intensity of light entering the transparent substrate 4 is made non-uniform in the longitudinal direction of the light source 6. Further, disposition of the two light sources 6 in parallel at the respective end surfaces 5 and 25 of the transparent substrate 4 is unfavorable in view of a demand for downsizing the light source, and effective countermeasures have been desired.

SUMMARY OF THE INVENTION

The present invention has been made in view of the above, and an object of the present invention is therefore to realize uniform light emission and high brightness as well in the spread illuminating apparatus while not increasing the size of the light source so as to meet the recent demand for downsizing and power saving.

According to a first aspect of the present invention to solve the above problems, in a spread illuminating apparatus of side light type having two bar-like light sources disposed on an end surface of a transparent substrate made of a light-transmissible material, the two light sources each comprising a bar-like light conductive member made of a transparent material and a spot-like light source disposed at one end of the light conductive member are disposed to overlap with each other in the thickness direction of the transparent substrate with respective spot-like light sources opposing each other.

In accordance with the present invention, light emitted from one spot-like light source into one light conductive member of the two directly therefrom enters the transparent substrate without passing through the other light conductive member and vice versa. Thus, light coming out from the one light conductive member and light coming out from the other light conductive member do not interfere with each other so as to prevent generation of interference fringes. Further, since the two light conductive members are disposed so as to overlap with each other in the thickness direction of the transparent substrate, the installation range of the light source does not expand in the direction orthogonal to the longitudinal direction of the light conductive members.

According to a second aspect of the present invention, in the spread illuminating apparatus of the first aspect of the present invention, the two light conductive members are each formed in a wedge-shape having a large end and a small end and are disposed so as to overlap with each other with the large end of the one conductive member aligned to the small end of the other light conductive member and vice versa. In this configuration, light entering the large end and traveling in the light conductive member is prevented from leaking from the small end and can be effectively introduced into the transparent substrate. In addition, the total dimension occupied by the two light conductive members can be held down from increasing in the thickness direction of the transparent substrate.

According to a third aspect of the present invention, in the spread illuminating apparatus of the second aspect of the present invention, the two light conductive members are each formed in a wedge-shape such that the dimension at least in the overlapping direction is changed. Thus, the dimensional increase in the thickness direction of the transparent substrate due to overlapping the two light conductive members can be held down.

According to a fourth aspect of the present invention, in the spread illuminating apparatus of any one of the first to third aspects of the present invention, the thickness formed by overlapping the two light conductive members is equal to or smaller than the thickness of the transparent substrate, resulting in downsizing. Also in this configuration, light coming from the light conductive member does not leak outside the transparent substrate and can be efficiently introduced into the transparent substrate.

According to a fifth aspect of the present invention, in the spread illuminating apparatus of any one of the first to fourth aspects of the present invention, the two light sources are disposed along an end surface of the transparent substrate and another end surface opposite thereto, respectively. And, the above end surfaces are illuminated by the corresponding light sources, respectively, thereby making light emission more uniform and brightness higher in the spread illuminating apparatus.

BRIEF DESCRIPTION OF THE DRAWINGS

In the accompanying drawings:

FIG. 1 is a schematic view showing an embodiment of a spread illuminating apparatus of side light type according to the present invention;

DESCRIPTION OF THE PREFERRED EMBODIMENTS

Figure 2A:
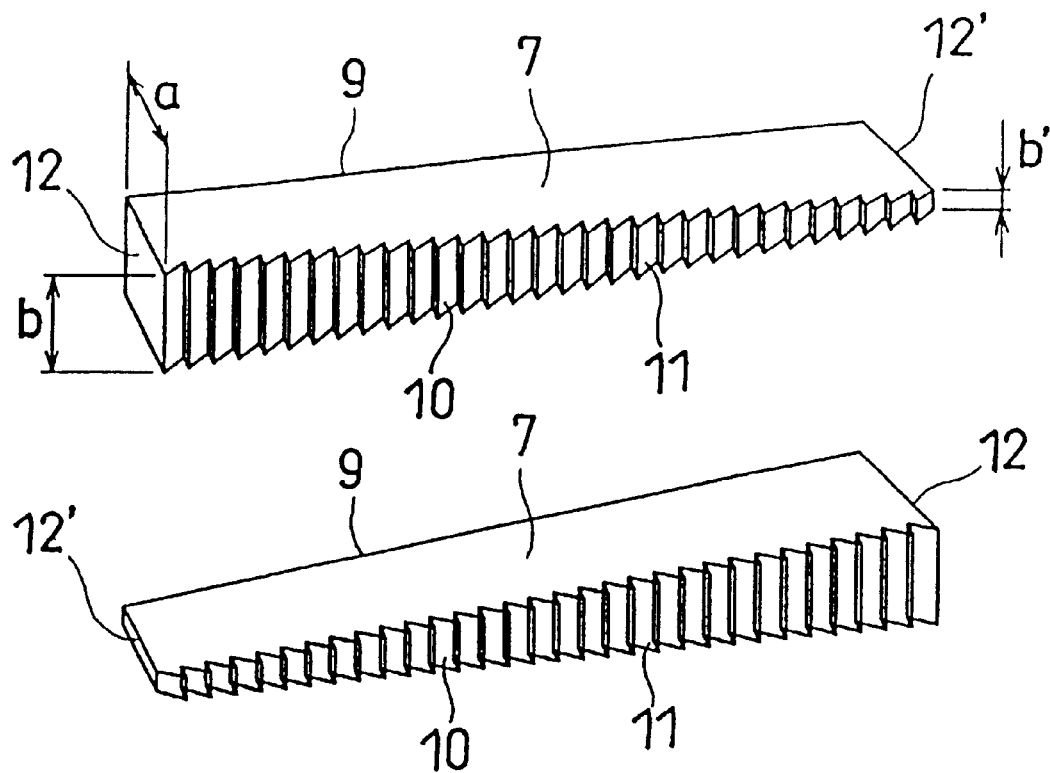
FIG. 2A is a perspective view showing one example of light conductive members of the spread illuminating apparatus shown in FIG. 1.

Preferred embodiments of the spread illuminating apparatus of the present invention will be hereinafter described with reference to the attached drawings. Note that parts and components identical with or equivalent to those in the conventional art are indicated with the same references and detailed descriptions thereof are omitted.

FIG. 1 schematically shows a spread illuminating apparatus 1 of side light type according to an embodiment of the present invention. This spread illuminating apparatus 1 includes a pair of light sources 6 disposed so as to overlap with each other in the thickness direction of a transparent substrate 4 and located along an end surface 5 of the transparent substrate 4 and another pair of light sources 6 located along an end surface 25 opposite to the end surface 5. In FIG. 1, one light source 6 of the pair disposed to overlap with each other comprises a light conductive member 7 with an end surface 12 (large end) showing and a spot-like light source 8 facing the end surface 12. The other light source 6 of the pair comprises a light conductive member 7 with an end surface 12' (small end) showing and a spot-like light source 8 facing an end surface (large end) opposite to the end surface 12'. The two light conductive members 7 are closely attached to each other so as to overlap with each other in the thickness direction of the transparent substrate 4.

Figure 2B:
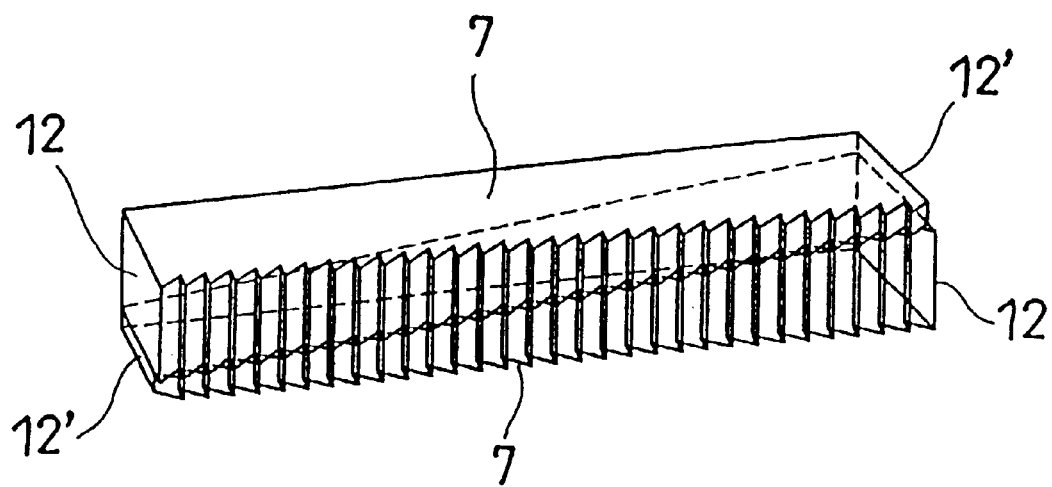
FIG. 2B is a perspective view of the light conductive members of FIG. 2A disposed to overlap with each other.

FIG. 2A shows the structure of each of the two light conductive members 7, and FIG. 2B shows the two light conductive members 7 of FIG. 2B disposed to overlap with each other in the thickness direction of the transparent substrate 4. While the dimension a in the width direction of the light conductive members 7 is constant throughout the whole length thereof, the dimension b in the thickness direction (overlapping direction) is gradually reduced to b', thereby forming a so-called "wedge-shape." One end with the dimension b constitutes the end surface 12 having a large area while another end with the dimension b' constitutes the end surface 12' having a small area. And, the two light conductive members 7 shown in FIG. 2A are disposed to overlap with each other such that the end surface 12 (large end) of one light conductive member 7 is aligned to the end surface 12' (small end) of the other light conductive member 7 and vice versa as illustrated in FIG. 2B.

Figure 3A:
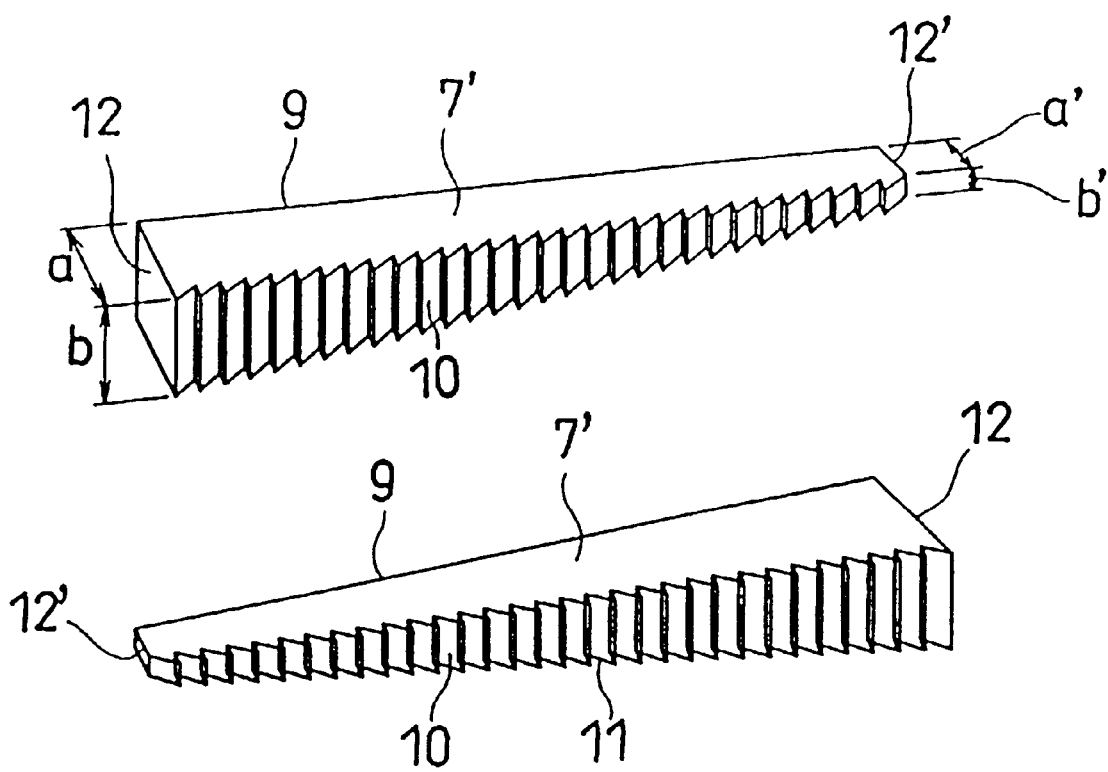
FIG. 3A is a perspective view showing another example of light conductive members shown.
Figure 3B:
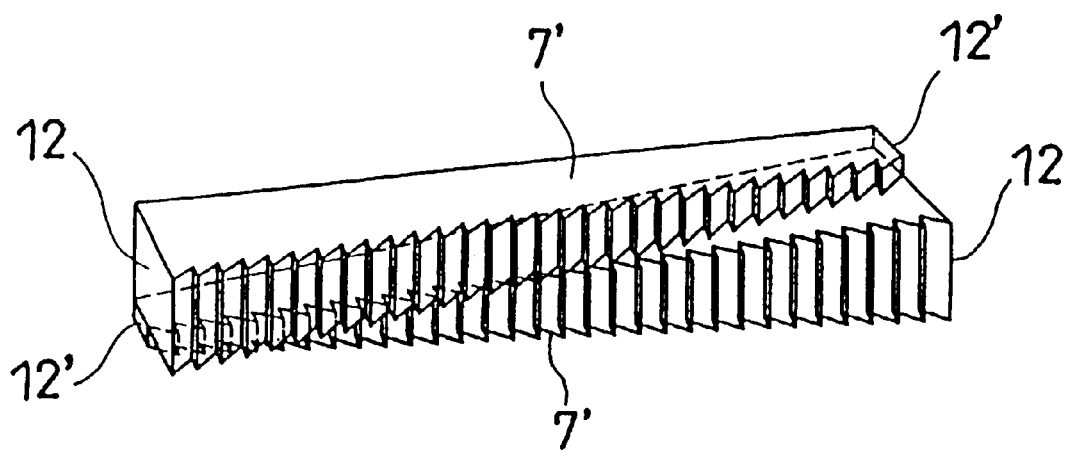
FIG. 3B is a perspective view of the light conductive members of FIG. 3A disposed to overlap with each other.

Further, as illustrated in FIG. 3, two light conductive members 7' each constructed such that not only the dimension in the thickness direction is reduced as described above but also the dimension in the width direction is reduced from a to a' may be used. The two light conductive members 7' shown in FIG. 3A are disposed to overlap with each other such that the end surface 12 (large end) of one light conductive member 7' is aligned to the end surface 12' (small end) of the other light conductive member 7' and vice versa as illustrated in FIG. 3B.

The light conductive members 7 and 7' are illustrated to have a light scattering portion 11 formed with continuous prisms and shaped like stairs; however, the formation of the light scattering portion 11 is not limited thereto, and may comprise a plurality of grooves, for example, triangular or trapezoidal in section and a plurality of flat portions adjacent thereto. In addition, the light scattering portion 11 may be formed by partially roughening one surface of the light conductive member.

The advantages obtained from the above embodiments of the present invention are hereinafter described. According to the embodiment of the present invention, light emitted from one spot-like light source 8 into one light conductive member 7 (7') of the two directly therefrom enters the transparent substrate 4 without passing through the other light conductive member. Thus, light rays coming out from the respective two light conductive members 7, 7 (7', 7') do not interfere with each other thereby preventing generation of interference fringes, and both uniform light emission and high brightness in the spread illuminating apparatus can be realized.

Further, since the two light conductive members 7, 7 are disposed to overlap with each other in the thickness direction of the transparent substrate 4, the installation range of the light sources 6 does not expand in the direction orthogonal to the longitudinal direction of the light conductive members. In addition, the two light conductive members 7, 7 (7', 7') are each formed in a wedge-shape having the large end (end surface 12) and the small end (end surface 12'), and are disposed so as to overlap with each other with the large end of one light conductive member aligned to the small end of the other light conductive member and vice versa as shown in FIGS. 2B and 3B. Thus, the increase in the total dimension of the two light conductive members [the total thickness (b+b') of the two light conductive members 7 or 7'] disposed to overlap with each other in the thickness direction of the transparent substrate 4 can be held down.

In case the two light conductive members 7' shown in FIG. 3 are used, not only the dimension in the thickness direction is reduced but also the dimension in the width direction is reduced from a to a' whereby the sectional area of the end surface 12' (small end) is further reduced compared with the light conductive member 7 shown in FIG. 2. Accordingly, light leakage from the small end is further suppressed resulting in that light is efficiently introduced into the transparent substrate 4, and the brightness of the screen is further improved.

Still further, if the overlapped thickness (b+b') of the two light conductive members 7 or 7' is set to be equal to or smaller than the thickness of the transparent substrate 4 for the purpose of downsizing, light coming out from the light conductive member 7 or 7' does not leak outside the transparent substrate 4 whereby light can be efficiently introduced into the transparent substrate 4.

By disposing a pair of light sources 6 along the end surface 5 and another pair of light sources 6 along the end surface 25 opposite to the end surface 5, the transparent substrate 4 is illuminated at both its end surfaces 5 and 25 thereby making light emission more uniform and brightness higher in the spread illuminating apparatus 1.

Figure 4:
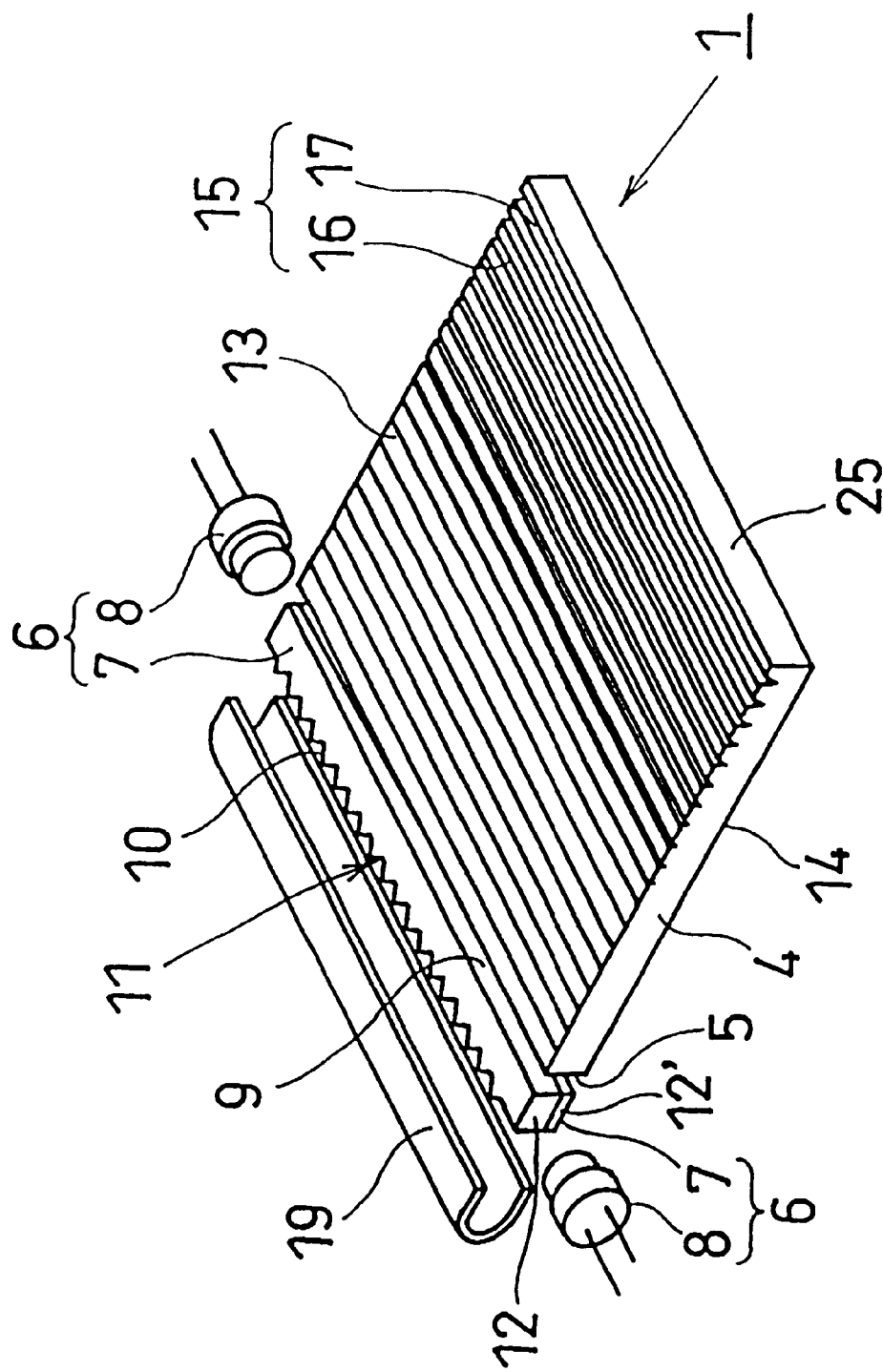
FIG. 4 is a schematic view showing another embodiment of a spread illuminating apparatus of side light type according to the present invention.
Figure 5:
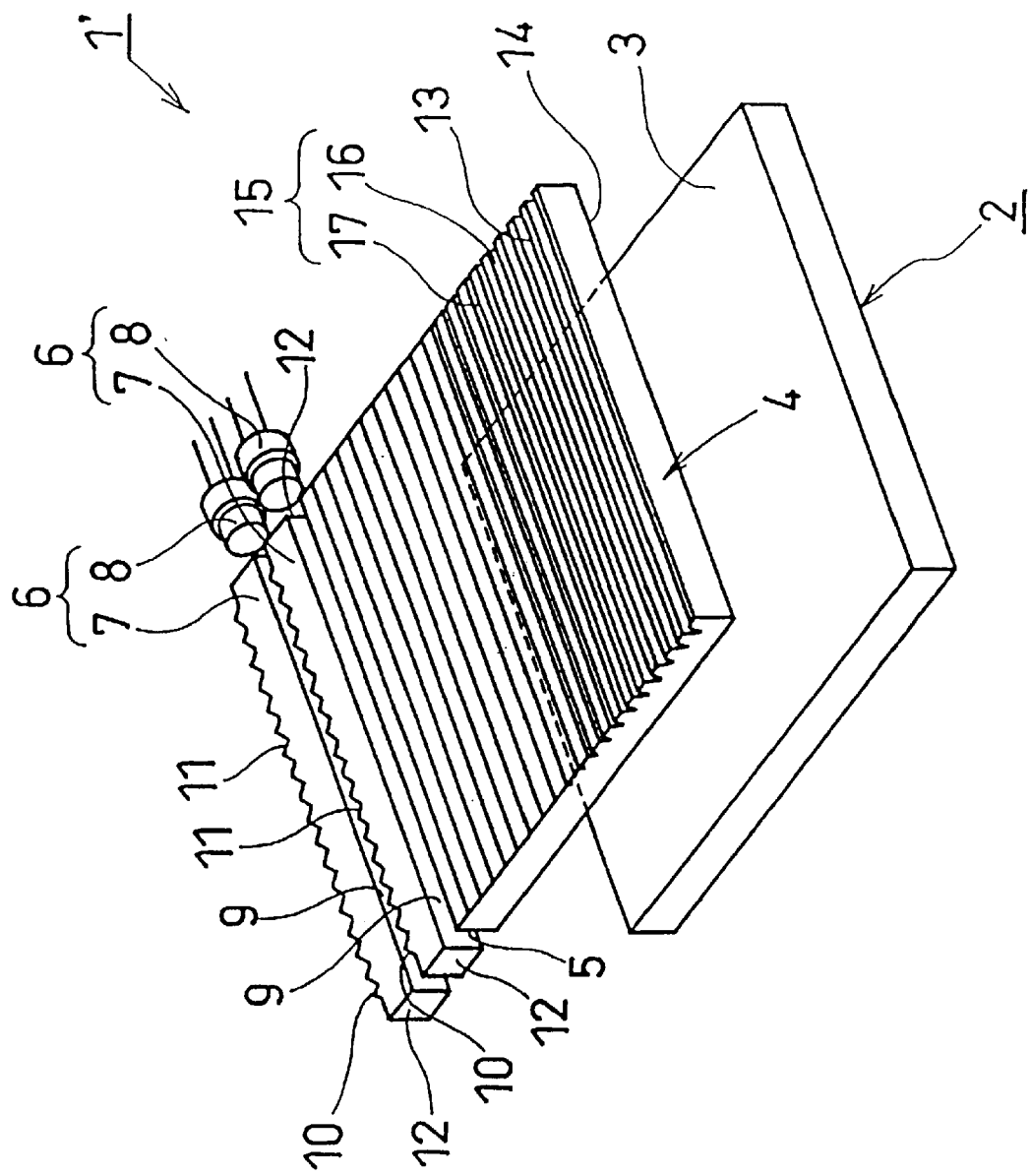
FIG. 5 is a schematic view showing a conventional spread illuminating apparatus of side light type.
Figure 6:
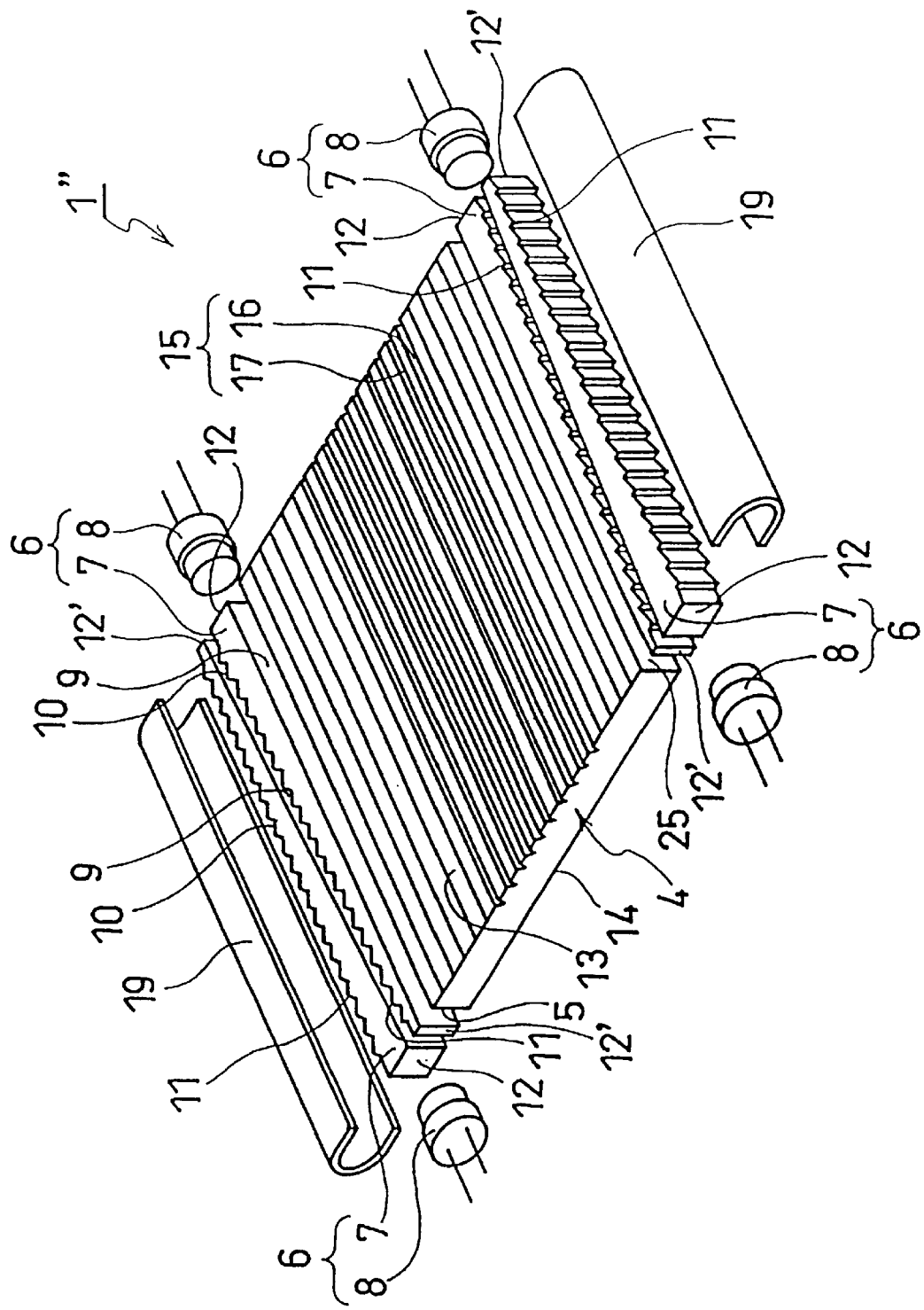
FIG. 6 is a schematic view showing another conventional spread illuminating apparatus of side light type.

When high brightness is not required and downsizing has priority over seeking higher brightness, the pair of light sources 6 should be disposed only on the end surface 5 of the transparent substrate 4 as illustrated in FIG. 4. In this case, a light reflecting layer is generally provided on the end surface 25 to reduce light leakage from the transparent substrate 4.

The present invention in the above configuration has the following advantages. At first, according to the first aspect of the present invention, both uniform light emission and high brightness can be realized. Further, in the spread illuminating apparatus of side light type, the light source is prevented from increasing in size thereby satisfying the recent demand for smaller thickness and lower power consumption of products.

According to the second aspect of the present invention, light leakage from the small end is reduced thereby making light efficiently travel from the light conductive member to the transparent substrate so that high brightness in the spread illuminating apparatus can be achieved. In addition, the two light conductive members are disposed so as to overlap with each other in the thickness direction of the transparent substrate thereby restricting the total dimension of the two light conductive members, whereby it can be prevented that the spread illuminating apparatus increases in size, which may result from taking steps to increase brightness.

According to the third aspect of the present invention, an increase in the total dimension of the two light conductive members, which may result from overlapping in the thickness direction of the transparent substrate, is held down, thereby preventing the increase in size of the spread illuminating apparatus, which is involved with improving brightness.

According to the fourth aspect of the present invention, light coming out from the light conductive member is efficiently guided into the transparent substrate, thereby improving the brightness in the spread illuminating apparatus. And, occupied volume of the light conductive members is set to be equal to or smaller than the thickness of the transparent substrate, whereby it can be prevented that the spread illuminating apparatus increases in size, which may result from taking steps to increase brightness.

According to the fifth aspect of the present invention, uniform light emission and high brightness in the spread illuminating apparatus can be further promoted.

What is claimed is:

1. A spread illuminating apparatus of side light type having a pair of bar-like light sources disposed on an end surface of a transparent substrate made of a light-transmissible material, wherein said pair of light sources each comprising a bar-like light conductive member made of a transparent material and a spot-like light source disposed at one end of said light conductive member are structured such that two light conductive members are disposed so as to overlap with each other in a thickness direction of said transparent substrate with respective spot-like light sources opposing each other.

2. The spread illuminating apparatus as claimed in claim 1, wherein said two light conductive members are each formed in a wedge-shape having a large end and a small end and are disposed so as to overlap with each other such that a large end of one light conductive member is aligned to a small end of the other light conductive member and vice versa.

3. The spread illuminating apparatus as claimed in claim 2, wherein said two light conductive members are each formed in a wedge-shape in which at least a dimension in an overlapping direction is gradually changed.

4. The spread illuminating apparatus as claimed in claim 1, wherein an overlapping thickness of said two light conductive members is equal to or smaller than a thickness of said transparent substrate.

5. The spread illuminating apparatus as claimed in claim 1, wherein said pair of light sources are disposed along an end surface of said transparent substrate and an end surface opposite thereto, respectively.

6. The spread illuminating apparatus as claimed in claim 2, wherein an overlapping thickness of said two light conductive members is equal to or smaller than a thickness of said transparent substrate.

7. The spread illuminating apparatus as claimed in claim 3, wherein an overlapping thickness of said two light conductive members is equal to or smaller than a thickness of said transparent substrate.

8. The spread illuminating apparatus as claimed in claim 2, wherein said pair of light sources are disposed along an end surface of said transparent substrate and an end surface opposite thereto, respectively.

9. The spread illuminating apparatus as claimed in claim 3, wherein said pair of light sources are disposed along an end surface of said transparent substrate and an end surface opposite thereto, respectively.

10. The spread illuminating apparatus as claimed in claim 4, wherein said pair of light sources are disposed along an end surface of said transparent substrate and an end surface opposite thereto, respectively.

* * * * *